United States Patent [19]

Burr

[11] Patent Number: 4,753,303

[45] Date of Patent: Jun. 28, 1988

[54] EARTH BORING BIT WITH TWO PIECE BEARING AND RIGID FACE SEAL ASSEMBLY

[75] Inventor: Bruce H. Burr, Houston, Tex.

[73] Assignee: Hughes Tool Company—USA, Houston, Tex.

[21] Appl. No.: 23,170

[22] Filed: Mar. 9, 1987

Related U.S. Application Data

[63] Continuation-in-part of Ser. No. 733,435, May 13, 1985, Pat. No. 4,666,001, which is a continuation-in-part of Ser. No. 542,801, Oct. 17, 1983, Pat. No. 4,516,641.

[51] Int. Cl.$^4$ .............................................. E21B 10/20
[52] U.S. Cl. .................................... 175/367; 175/372; 175/359; 277/83; 277/84; 277/91; 277/92; 384/95
[58] Field of Search .............. 175/367, 368, 369, 371, 175/372, 359; 384/94, 95, 96; 277/83, 84, 91, 92

[56] References Cited

U.S. PATENT DOCUMENTS

| | | | |
|---|---|---|---|
| 1,884,965 | 10/1932 | Baggett et al. | 384/94 |
| 2,065,742 | 12/1936 | Reed | 384/96 |
| 3,075,781 | 1/1963 | Atkinson | 277/83 |
| 3,180,648 | 4/1965 | Kupfert | 277/8.2 |
| 3,216,513 | 11/1965 | Robbins | 175/227 |
| 3,397,928 | 8/1968 | Galle | 308/8.2 |
| 3,403,916 | 10/1968 | Durham | 277/92 |
| 3,452,995 | 7/1969 | Engelking | 277/92 |
| 3,524,654 | 8/1970 | Hasselbacher | 277/92 |
| 3,656,764 | 4/1972 | Robinson | 277/92 |
| 3,761,114 | 9/1973 | Schumacher | 308/8.2 |
| 3,922,038 | 11/1975 | Scales | 175/374 X |
| 4,014,595 | 3/1977 | Dolezal | 308/8.2 |
| 4,019,785 | 4/1977 | Stinson | 308/8.2 |
| 4,077,634 | 3/1978 | Durham | 277/92 |
| 4,176,684 | 12/1979 | Lafuze | 277/92 |
| 4,276,946 | 7/1981 | Millsapps | 175/228 |
| 4,516,641 | 5/1985 | Burr | 175/372 X |
| 4,600,064 | 7/1986 | Scales et al. | 175/368 |
| 4,666,001 | 5/1987 | Burr | 175/371 |
| 4,671,368 | 6/1987 | Burr | 384/94 X |

OTHER PUBLICATIONS

William C. Maurer, Patent Search and Review on Roller-Bit Bearing Seals & Lubricant Systems, Dept. of Energy, Oct. 14, 1975, pp. 71–103.
R. R. Hendrickson, Support Research for Development of Improved Geothermal Drill Bits, Dept. of Energy, Jun. 1977, pp. 63–68.
Caterpillar Parts Book D10 Tractor, etc., Nov. 1978, pp. 171–174.

Primary Examiner—George A. Suchfield
Assistant Examiner—John F. Letchford
Attorney, Agent, or Firm—Robert A. Felsman

[57] ABSTRACT

An earth boring bit having a cantilevered bearing shaft and a compensator system to equalize the pressure of the lubricant with the hydrostatic pressure of the drilling fluid surrounding the bit. A rigid face seal assembly, positioned between the cutter and bearing shaft of the bit, moves axially in response to, and to compensate for, dynamic pressure changes in the lubricant adjacent the seal. The positioning and sizing of resilient energizer rings in relationship to the geometries of the mating grooves between the cutter and shaft and the rigid sealing rings of the face seal assembly minimize axial seal movement relative to cutter and shaft during drilling to enhance seal life. A threaded bearing lug receives an internally threaded bearing sleeve. The journal bearing surface is approximately midway between the shaft seal groove, a portion of which is on its bearing sleeve and another portion on the cutter seal groove.

15 Claims, 9 Drawing Sheets

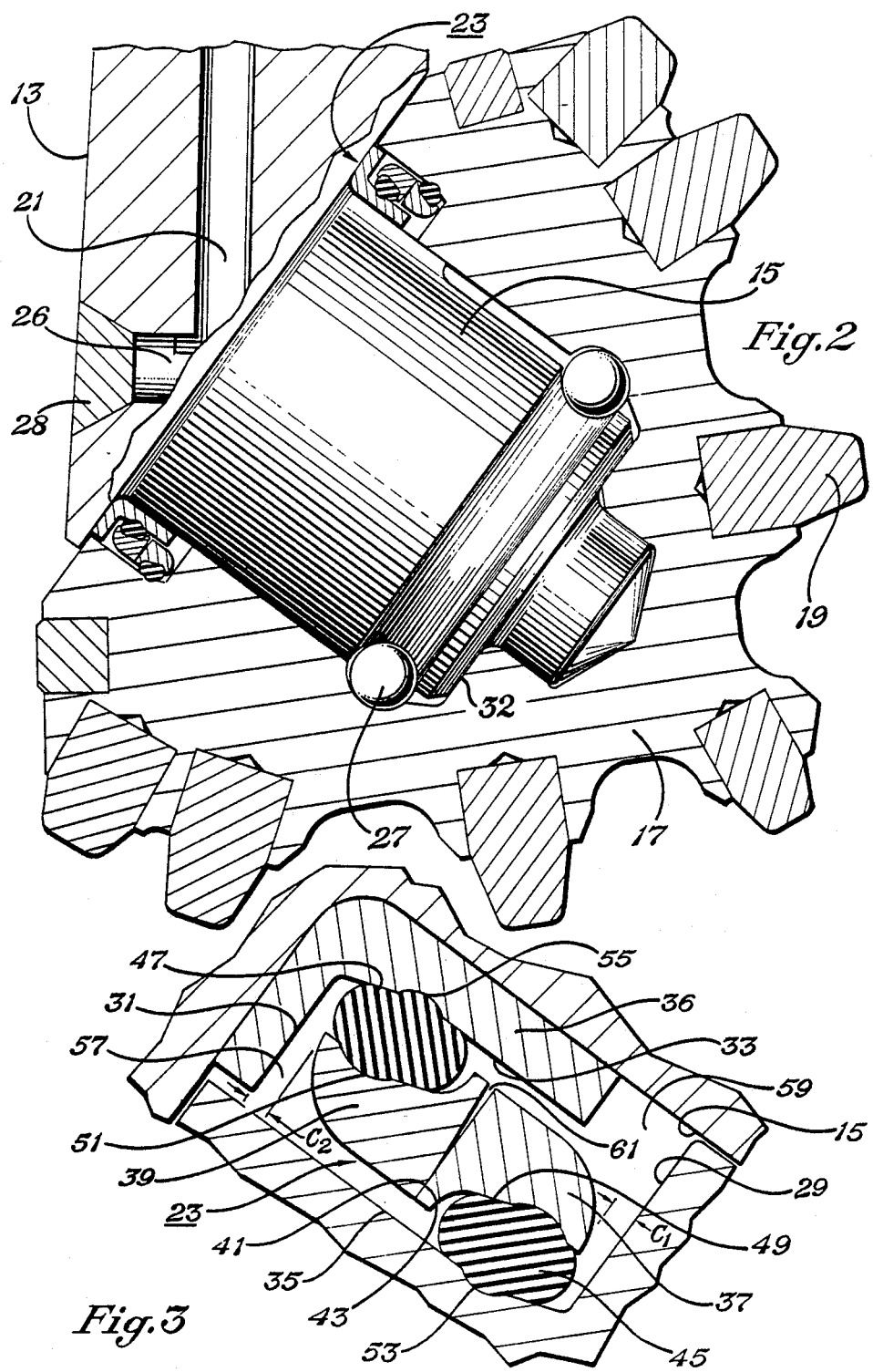

EARTH BORING BIT WITH TWO PIECE BEARING AND RIGID FACE SEAL ASSEMBLY

CROSS REFERENCE TO RELATED PATENTS

This application is related to, and is a continuation-in-part of, a previous application: "Earth Boring Bit With Improved Rigid Face Seal Assembly" Ser. No. 733,435, filed May 13, 1985, now issued as U.S. Pat. No. 4,666,001, which is a continuation-in-part of application, "Earth Boring Bit With Pressure Compensating Rigid Face Seal", Ser. No. 542,801 filed Oct. 17, 1983, now U.S. Pat. No. 4,516,641.

This application has disclosure in common with an application of Joseph L. Kelly, Jr., entitled "VOLUME AND PRESSURE BALANCED RIGID FACE SEAL FOR ROCK BITS", Ser. No. 023,178, filed Mar. 9, 1987.

BACKGROUND OF THE INVENTION

1. Field of the Invention

This invention relates to earth boring bits, lubricated with a system which includes a hydrostatic pressure compensator to balance the internal pressure of the lubricant inside the bit with the hydrostatic pressure of a liquid drilling fluid that surrounds the bit during drilling. In this combination, the specific improvement relates to the seal and bearing assembly between each cutter and bearing shaft.

2. Background Information

The preferred embodiment in the above U.S. Pat. No. 4,516,641 utilizes a pair of rigid face seals positioned in a seal groove, including a pair of resilient energizer rings, preferably of the O-ring type. The dimensional relationships of the sealing components and the groove result in greater axial movement of the rigid face seals than the associated cutter.

As a bit rotated during drilling, its cutters move axially, or with a rocking motion, on the bearing shafts because of the clearances and normal manufacturing tolerances. Some clearances are necessary to assemble the cutters on the shafts. Axial and radial cutter movements which results from the clearance between cutter and shaft causes rapid pressure variations in the lubricant, or more accurately, volume changes in the lubricant in the vicinity of each seal. In the preferred embodiment of the above U.S. Pat. No. 4,516,641, the rigid face seals may move axially a distance greater than the axial cutter movement by a ratio of about 1.88 to one.

The disclosure in the second of the above U.S. Pat. No. 4,666,001 teaches the positioning of the seal groove and seal assembly in relation to the bearing surface such that rigid face seal movement is decreased relative to axial cutter movement during drilling to enhance seal life. Preferably the ratio of rigid ring movement to axial cutter movement is substantially one-half to one.

A two piece bearing construction is disclosed in U.S. Pat. No. 4,600,064, "Earth Boring Bit With Bearing Sleeve", July 15, 1986. An internally tapered and threaded bearing sleeve is made up on a mating, externally threaded bearing lug. The mouth of the sleeve engages a shoulder on the base region of the bearing lug and has a selected radial thickness such that the sleeve may be made up to a selected torque. Also, the bearing sleeve has a length greater than that of the threaded portion to define a thick walled inner end region to receive a resilient retainer ring in a groove that provides a selected section over the threads on the interior of the sleeve.

SUMMARY OF THE INVENTION

The general object of this invention is to provide an improved rigid face seal assembly in a rock bit of the type susceptible to pressure or volume changes in the vicinity of the seal assembly when the associated cutter moves during drilling. The improvement decreases the pressure or volume changes in the vicinity of the seal assembly by positioning the seal groove and seal assembly in relation to the bearing surface such that rigid face seal movement is decreased relative to axial cutter movement. In a preferred embodiment the axial movement of the rigid face seal with respect to the shaft is about one half that of the cutter, and is achieved by making the bearing surface intermediate the radial thickness of the seal assembly groove. That is, part of the groove is in the cutter and the other is in the bearing shaft. The relationship of seal movement to cutter movement is established by dimensioning consistent with the following formula, derived for this invention:

$$S = 2G - C/H + C + 2A$$

Where:
- S = Seal Movement For Unit Cone Movement Relative to the Shaft
- H = Effective Shaft O-Ring Annular Area
- C = Effective Cutter O-Ring Annular Area
- A = Effective Rigid Ring Annular Area
- G = Effective Cutter Seal Groove Annular Area The preferred embodiment uses a threaded bearing lug upon which is threaded a bearing sleeve containing about one half the radial thickness of the total seal groove. This portion of the seal groove is called the shaft groove. The other radial portion of the total seal groove is formed in the cutter.

Additional objects, features and advantages of the invention will become apparent in the following description.

DESCRIPTION OF THE DRAWINGS

FIG. 2 is a fragmentary view in longitudinal section of the lower portion of a bit, enlarged with respect to FIG. 1, to better expose the seal assembly.

FIG. 3 is a fragmentary view in longitudinal section of yet another portion of the cutter and bearing shaft, showing the bearing seal assembly enlarged with respect to the illustration of FIG. 2.

DESCRIPTION OF THE PREFERRED EMBODIMENTS

FIGS. 1-7

Figure 1:
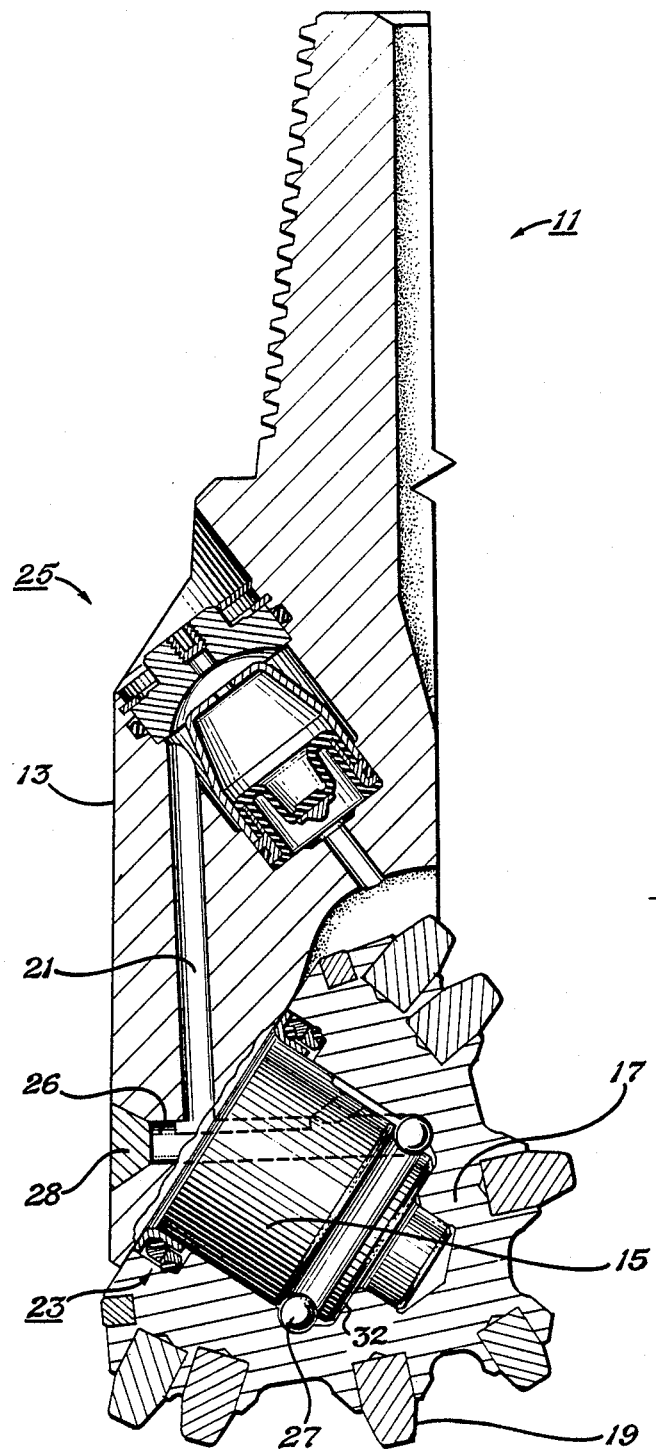
FIG. 1 is a view in longitudinal section of a portion of an earth boring bit, showing the compensator system, bearing shaft, cutter and one embodiment of a seal assembly.

The improvement of this invention is best appreciated by initial reference to the disclosure of one of the related patents, U.S. Pat. No. 4,516,641, which is shown in FIGS. 1-7 herein. The numeral 11 in FIG. 1 designates a lubricated, rotatable cone or cutter type earth boring bit having a body formed in three head sections or legs 13, only one of which is shown. Each leg 13 includes an oblique cantilevered bearing shaft 15 that depends inwardly and downwardly to support a rotatable cutter 17 having earth disintegrating teeth 19. Lubricant passage 21 supplies lubricant to the bearing surfaces between the bearing shaft 15 and cutter 17. A seal assembly 23 retains lubricant in the bearing and prevents borehole fluid from entering the bearing. A hydrostatic pressure compensator is part of a lubrication system 25 connected with the lubricant passage 21 to equalize the pressure of the liquid lubricant inside the bearing with the hydrostatic pressure of the fluid in the borehole. A preferred compensator system is shown in the patent to Stuart C. Millsapps, Jr., U.S. Pat. No. 4,276,946.

The geometry of the bearings on the shaft 15 and within the cutter 17 are of a prior art configuration, including the use of a ball bearing retainer 27, which with a plug 26 welded at 28 retains the cutter on the bearing shaft, preferably as shown in the U.S. patent of Robert A. Cunningham, U.S. Pat. No. Re. 28,625.

Referring especially to FIG. 3, the cutter and shaft include an annular seal groove or gland that has axially spaced, generally radial end walls 29, 31 and inner and outer circumferential walls 33, 35. End wall 31 and circumferential wall 33 are formed upon a seal seat insert 36 secured to the bearing shaft 15.

The seal assembly includes a pair of annular rigid rings 37, 39 with opposed radial faces 41, 43. The pair of rigid, preferably metal, rings have a radially measured thickness less than the annular space between the inner and outer side walls 33, 35 of the groove and an axially measured width which is less than the width or the distance between the end walls 29, 31 of the groove, as will be explained more fully hereafter.

Each of a pair of resilient, energizer rings 45 or 47 extends between a seal seat 49 or 51 on one of the metal rings 37 or 39 and an opposed seal seat 53 or 55 on the inner or outer circumferential walls 33, 35. Each seal seat has an annular groove and configuration to position and retain the associated energizer ring and the metal ring, which is suspended within the groove intermediate the circumferential walls 33, 35 and the end walls 29, 31 to provide clearances $C_1$ and $C_2$ which exist when the thrust surfaces 32 are in contact. The positions of seats 53 and 55 relative to each other are selected such that, at assembly, the initial deflection of each seal half relative to its adjacent end wall 29 or 31 will provide sufficient contact pressure between radial faces 41 and 43 to maintain sealing contact between all the elements of the seal assembly throughout the full range of seal movements permitted by clearances $C_1$ and $C_2$ and the play between cutter and shaft. See U.S. Pat. No. 3,180,648 for a description of an earlier construction of a conical, "Duo Cone" seal arrangement of the Caterpillar Tractor Company, and U.S. Pat. Nos. 3,403,916, 3,524,654 and 4,077,634 for improvements to such seals.

From FIG. 3 it may be seen that one of the metal rings 37, 39 is inverted with respect to the other, a feature which permits the seal assembly to span the groove diagonally and engage opposite circumferential walls 33, 35. The clearances $C_1$ and $C_2$ are between each of the end walls 29, 31 of the groove and the engaged rigid rings 37, 39. Drilling fluid fills the space 57 and acts upon the outermost side of the seal assembly 23, and lubricant fills the space 29 and acts upon the innermost side of the assembly. The rigid rings 37 or 39 have a beveled, substantially conical portion on the lubricant side of the seal assembly to define a space 61 to feed lubricant to the engaged radial faces 41, 43, which regenerate inwardly as they wear in service. See U.S. Pat. No. 3,180,648 for a description of one configuration of such seal faces.

Figure 4:
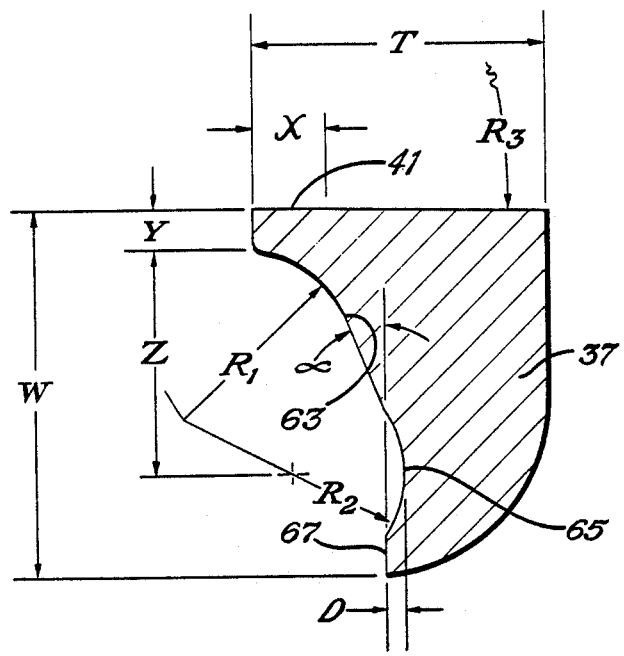
FIG. 4 is an enlarged longitudinal section of one of the rigid rings of the seal assembly.
Figure 5:
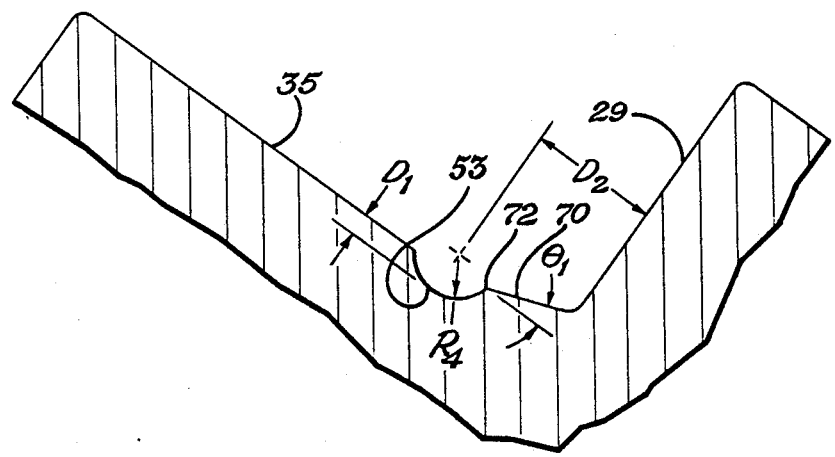
FIG. 5 is a fragmentary, longitudinal section of the seal seat and conical surface seal groove in the cutter.

The dimensions provided below relate to the bit used in the first field test of the invention, which was a "Hughes" 12¼ inch, J22 type bit. With reference especially to FIGS. 4 and 5, the radial thickness T of each of the three metal rings 37 was 0.200 inch, the axial width W was about 0.270 inch and the outside diameter was about 3.449 inches. Angle $\alpha$ was about twenty degrees and the radii $R_1$ and $R_2$ averaged 0.048 and 0.080 inch respectively, $R_1$ being tangent with the conical surface 63. The axial dimensions Y and Z averaged respectively 0.050 and 0.149 inch. The depth D of the positioner groove 65 below the lip 67 averaged 0.009 inch to help position and confine the associated energizer ring 45 during assembly. The radial thickness X of the radial sealing face 41 was about 0.050 inch with a surface finish of about one or two RMS and a tapered surface defined by a spherical radius $R_3$ of about 80 inches with a surface finish of about two or three RMS.

The inverted and opposing metal rings 39 has a radial thickness T of about 0.199 inch, a radial width W of about 0.247 inch and an outside diameter of about 3.450 inches. Angle $\alpha$ was about 19 degrees, and the radii $R_1$ and $R_2$ were both about 0.075 inch. The axial dimensions Y and Z were respectively about 0.023 and 0.154 inch and the depth D of the positioner groove being about 0.016 inch. There was a flat sealing face on the rings 39 that extended across the entire thickness T of the ring, that had a surface finish similar to that of rings 37.

Ring 37 was purchased from Caterpillar Tractor Company and is one of their standard hard metal alloy rings. Ring 39 was manufactured by Hughes Tool Company specifically for this invention from an air hardening tool steel.

The configuration of the seal seat in the cutter 17 of the bit is shown in FIG. 5. The seal seat was defined by a conical surface 70 having an angle $\theta_1$ of about 19½ degrees, a positioner groove or seal seat 53 having a radius $R_4$ of about 0.060 inch located a distance $D_2$ of about 0.129 inch from end wall 29, and a depth $D_1$ of about 0.008 inch. The conical surface 70 intersected the groove 53 at a point 72 which was located radially from the surface 35 a distance of about 0.021 inch.

Figure 6:
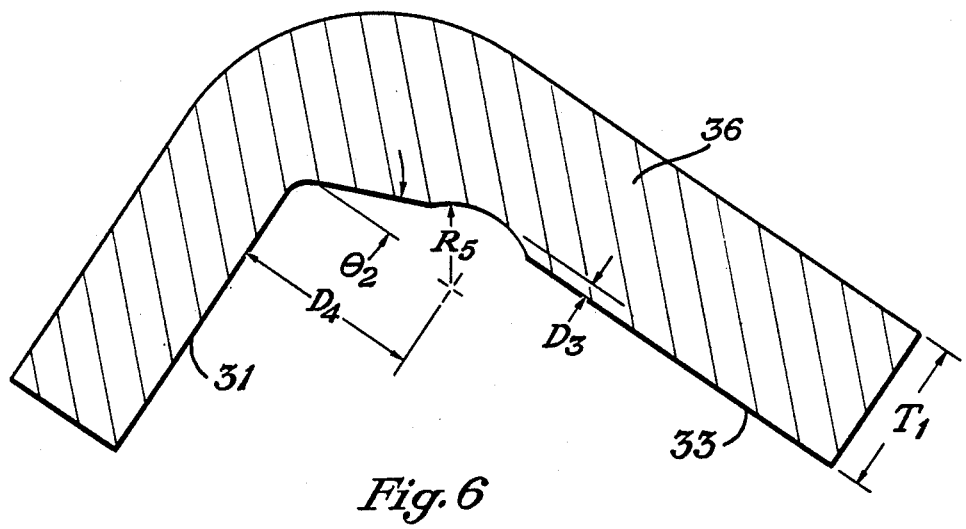
FIG. 6 is a longitudinal section of the seal seat annular insert used on the bearing shaft to form the conical, contoured surface that receives and positions the seal assembly.

A similar configuration was used for the seal seat on the bearing shaft 15, defined in this instance by the seal seat insert 36 shown in FIG. 6 having a thickness $T_1$ of 0.105 inch. The positioner groove had a depth $D_3$ of about 0.011 inch, formed by a radius $R_5$ of about 0.060 inch located a distance $D_4$ about 0.140 inch from end wall 31. $\theta_2$ was a conical angle of about 20 degrees located in a manner similar to the conical surface 70 of FIG. 5.

The O-rings or energizer rings 45, 47 after service had a cross-sectional thickness of about 0.168 inch, a hardness of about 59 durometer, Shore A, inside diameters of about 3.057 and 2.760 inches respectively, and a high resilience, measured to be about 43 percent rebound using the above described O-rings and a Shore Resiliometer, Model SR-1. The radial end walls 29, 31 of the seal groove were located a width of about 0.580 inch apart with bearing thrust surfaces 32 in mutual contact. Using the above components, the assembly loading on the faces of the rigid rings was about 40 to 60 pounds, as determined from load deflection curves. The clearances $C_1$ and $C_2$ were respectively about 0.035 and 0.029 inch at assembly with thrust surfaces 32 in contact to define the minimum groove width and the diameters of the circumferential walls 33, 35 were respectively about 2.969 and 3.529 inches.

For the first bit tested, the axial bearing play of each of the cutters, after testing was:

Axial Play (inch)
No. 1 Cutter: 0.012
No. 2 Cutter: 0.015
No. 3 Cutter: 0.012

In operation, and during drilling in a well bore filled with liquid, the compensator 25 acts to balance the hydrostatic pressure of the liquid in the well bore with the pressure of the liquid lubricant inside the bearing. However, cutter movements during drilling, caused by the complex forces applied to a cutter, and the clearances which are of necessity used to enable assembly of the parts, produce rapid changes in the volume defined by the space 59. The viscosity of the lubricant and flow restrictions between the space 59 and hydrostatic pressure compensator 59 do not allow compensation for the volume changes in space 59 as rapidly as they occur. Nevertheless, seal assembly 23 will move sufficiently to provide the required volume change and thereby minimize the pressure changes experienced by the seal which would otherwise cause rapid depletion of the lubricant supply or entry of borehole fluids into the bearing, with resulting bearing and seal damage.

Use of the seal assembly 23 described above in a bit which includes a hydrostatic pressure compensator minimizes the pressure differentials to which the seal assembly is exposed through the cooperative relationship of the hydrostatic pressure compensator and the dynamic pressure compensating abilities of the seal assembly. The seal assembly is one which spans diagonally the seal groove such that one of the resilient energizer rings engages a wall of the cutter, while the other energizer ring engages a wall of the shaft. Thus, the outermost portion of each of the energizer rings is exposed to the fluid in the borehole, while an innermost portion of each of the energizer rings is exposed to the lubricant inside the bearing. Every pressure differential is therefore sensed by the seal assembly, which is moved by each such pressure differential. A seal assembly which cannot be moved by the differential pressure cannot effectively compensate for dynamic changes in the volume of space 59. Preferably the seal half consisting of energizer ring 47 and rigid ring 39 should have the same axial load deflection characteristics as the mating half consisting of energizer ring 45 and rigid ring 37 to balance and minimize the increase in the loading of engaged radial faces 41 and 43 caused by pressure differentials.

Another requirement for a satisfactory seal assembly, and the groove in which it is placed, is that the assembly be positioned between the end walls of the groove to permit unrestricted axial movement of the rigid rings between the walls of the groove in response to sensed pressure differentials. If the bearing lubricant could freely enter and leave space 59 as the volume of space 59 is changed by cutter movement, the pressure differentials acting on the seal would be negligible and the movement of the rigid rings would be less than the cutter movement. Furthermore, if the load deflection characteristics of each half were equal, as preferred, the rigid ring movement would be on-half the cutter movement in the above described embodiment. However, because lubricant movement is restricted, greater rigid ring movement must be provided for. The required clearances $C_1$ and $C_2$ were determined by building a model of the seal cutter and shaft assembly and measuring the movement of the rigid rings in response to cutter movement with the exit from space 59 blocked; for example, by a conventional O-ring seal between the bearing surfaces of the simulated cutter and shaft. To be sure that accurate rigid ring movement takes place in the model, it is important to have space 59 completely filled with an incompressible fluid that is free of any air or vapor pockets. Furthermore, in some cases, it may be necessary to pressurize space 57 with air to insure complete rigid ring movement in response to movement of end wall 29 away from end wall 31.

A model as hereinabove described was used to measure the movement of the rigid rings in response to cutter movement for the shaft, cutter and seal used in the first test bit. Air pressure in space 57 was not required for this test because the pressure in space 59 did not drop below the vapor pressure of the fluid used to fill the space. The ratio of the rigid ring movement to cutter movement was determined from the measurements to be 1.88:1. This ratio is influenced by the geometry of space 59, the size, shape and elastic properties of the energizer rings and the manner in which the energizer rings are deformed by the rigid rings and wall of the seal groove. Thus, a change in any of these parameters is likely to cause a change in required clearances $C_1$ and $C_2$.

After the ratio of the rigid ring movement to cutter movement has been established, as described above, the minimum values for $C_1$ and $C_2$ may be calculated. The maximum seal or rigid ring movement with respect to the bearing shaft is calculated by multiplying the axial play between the cutter and shaft by the ratio of rigid ring movement to cutter movement. When bearing thrust surfaces 32 are in contact, the first axial clearance $C_1$ between rigid ring 37 and the inner wall 29 of the groove should be greater than the maximum rigid ring movement less the axial play between the cutter and the shaft. The second axial clearance $C_2$ between rigid ring 39 and the outer end wall 31 of the groove measured with the thrust surfaces 32 in contact should be greater than a value equal to the maximum rigid ring movement as calculated above less the displacement which rigid rings 37 and 39 undergo when the space between end walls 29 and 31 is increased by axial play from its minimum length to its maximum length in the absence of any pressure differential across the seal. This displacement of rigid rings 37 and 39 in the absence of a pressure differential can be determined with the model if space 59 is vented or it can be calculated with the aid of the load deflection curves for the seal halves.

Figure 7:
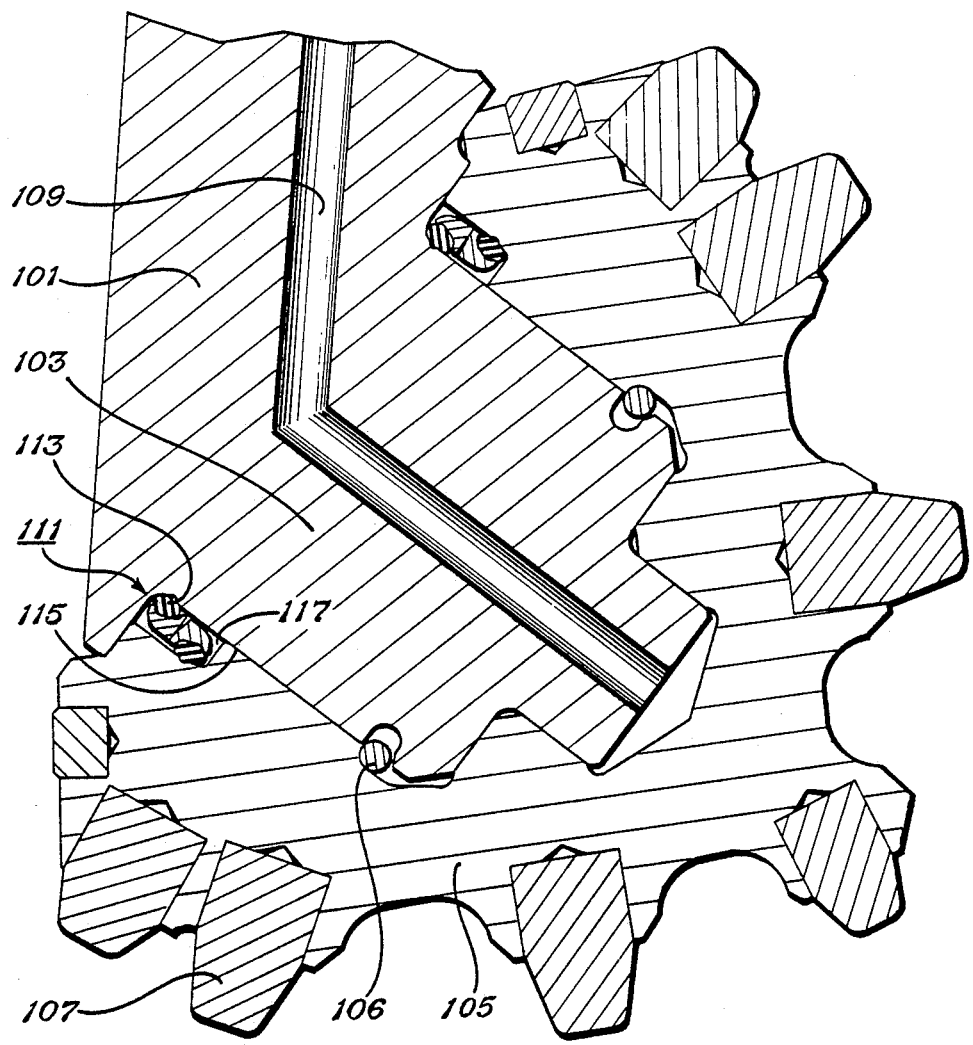
FIG. 7 is a fragmentary view in longitudinal section of the lower portion of an alternate embodiment of the invention shown in FIG. 1.

While the embodiment of the invention disclosed above was that of the initial test, the commercial embodiment is expected to be closer to that shown in FIG. 7. The leg 101 includes an oblique cantilevered bearing shaft 103 that depends inwardly and downwardly to support a rotatable cutter 105 having earth disintegrating teeth 107. A lubricant passage 109 supplies lubricant to the bearing surfaces between the bearing shaft 103 and the cutter 105. A snap ring retainer 106 similar to that shown in U.S. Pat. No. 4,344,658 is used in place of the ball retainer shown in FIG. 1.

A seal assembly 111 retains lubricant and excludes borehole fluids. This seal assembly has the same configuration as assembly 23 of FIG. 3, however, the innermost energizer ring 113 engages directly the journal bearing cylindrical surface 115, rather than a seal seat insert 36. A seal seat configuration is provided similar to the seal seat 55 and inner circumferential wall 33 in the FIG. 3 embodiment. This reduces the diameter of the seal seat of FIG. 7, as compared to the diameter of the seal seat in FIG. 3. This reduction in diameter of the seal seat in relation to the diameter of journal bearing cylindrical surface 115 reduces the ratio of rigid ring movement to cutter movement. This ratio, determined by making a model similar to the one described in connection with the FIG. 3 embodiment, except using the FIG. 7 bearing configuration, is 1.28:1. The materials for the various components of the seal assembly are identical with the materials used in the embodiment of FIGS. 1–4 except both rigid rings are preferably constructed of the same hard metal alloy at ring 37.

FIGS. 8–9

An alternate to the disclosure above appears in the application from which this application continues, now U.S. Pat. No. 4,660,001, and is shown in FIGS. 8 and 9.

Figure 8:
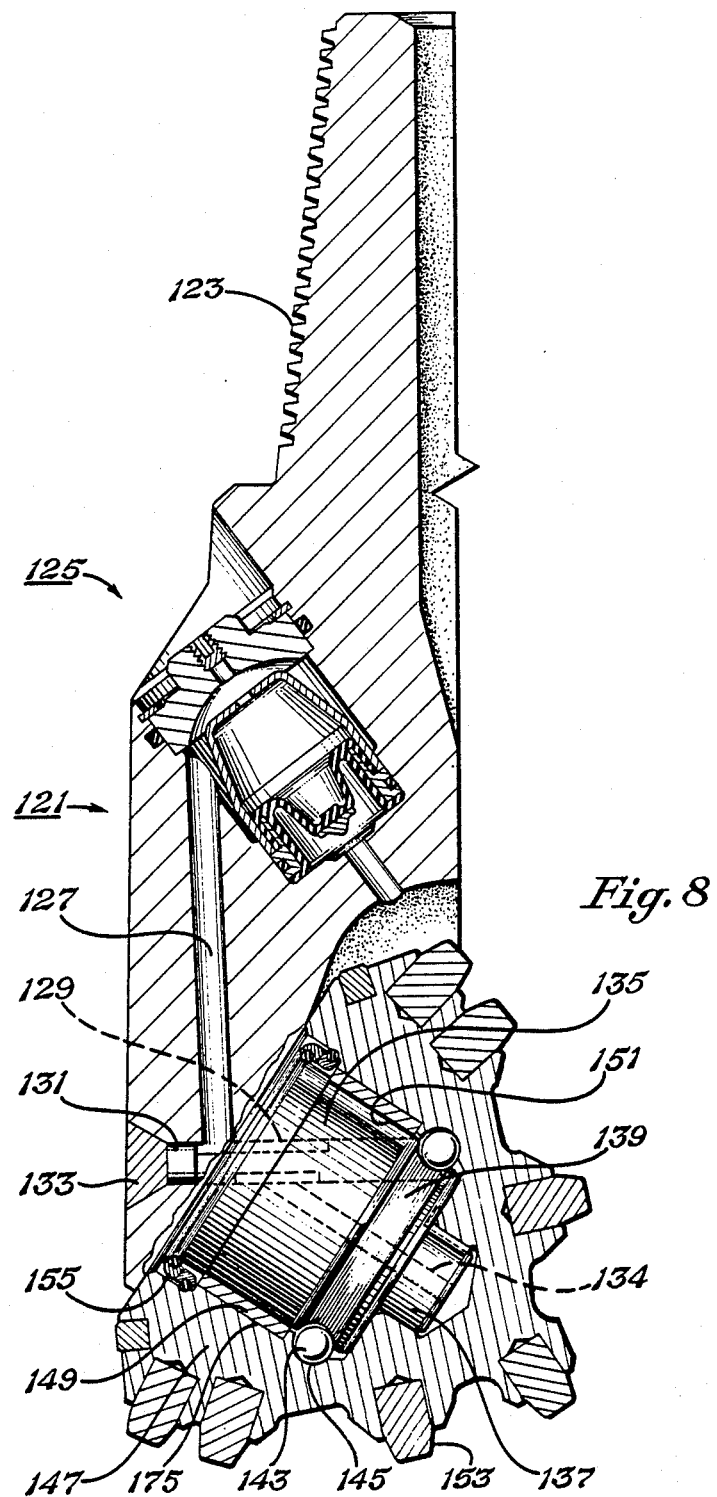
FIG. 8 is a view in longitudinal section of a portion of an earth boring bit having an improved rigid face seal assembly to reduce during drilling the amount of seal movement relative to cutter movement.

In FIG. 8 the numeral 121 designates one section of a rock bit having a threaded upper end or shank 123, a lubrication system 125 of the type previously described, which feeds lubricant a the passage 127, and to a passage 129 formed in a ball plug 131 secured by weld 133 to the section 121. Additional passage means 134 enables lubricant communication with the bearing shaft 135, which has on its interior and cantilevered end a pilot pin 137 and ball bearing raceway 139.

The ball plug 131 retains plural ball bearings 143 in the ball bearing raceway 139 and in a mating raceway 145 in the cutter 147. A bearing sleeve 149 has an interior surface 151 which engages with interference fit a mating portion on the bearing shaft 135. An annular exterior bearing surface 175 engages a mating cylindrical bearing surface 173 in the cutter 147. These bearing elements enable rotation of the cutter 147 such that the earth disintegrating teeth 153 engage and disintegrate geological formations during drilling.

Figure 9:
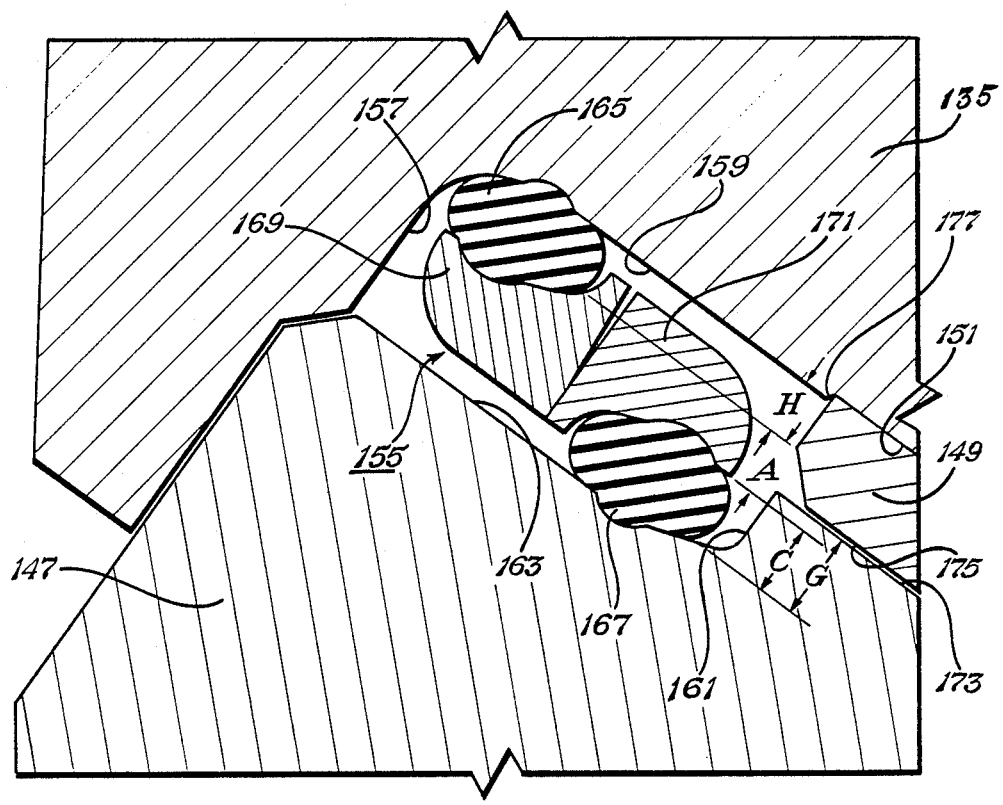
FIG. 9 is an enlarged fragmentary view in longitudinal section of the preferred seal assembly and groove embodiment shown in FIG. 8.

To seal lubricant within the cutter 147 for lubrication of the above described bearing surfaces, a seal assembly 155 is provided, which may be better seen with reference to FIG. 9.

The seal assembly 155 is disposed partially within a generally L shaped groove in the shaft 135, as best seen in FIG. 9, having a radial end wall 157 and a circumferential wall 159. Another groove is located within the cutter 147, having a radial end wall 161 and circumferential wall 163.

Confined within the grooves are a pair of energizer rings 165, 167 and rigid annular rings 169, 171. The geometries of the groove-surfaces, the energizer rings and the annular rings shown here are identical with those described in the preceding embodiment. However, the bearing surface 175 is located substantially midway between the circumferential walls 159, 163 and is defined by a bearing sleeve 149 having an annular surface 151 retained by interference fit in a mating annular slot with a small shoulder 177 located in the bearing shaft.

The improvement of FIGS. 8 and 9 decreases the lubricant pressure and volume changes in the vicinity of the seal assembly by positioning the seal groove and seal assembly in relation to the bearing surface 175 such that the ratio of rigid face seal movement to cutter movement is about one half to one. This is achieved by making the bearing surface 175 intermediate the radial thickness of the seal assembly grooves or the diameters of the circumferential surfaces 159, 163. That is, part of the groove is in the cutter and the other is in the bearing shaft. The relationship of seal assembly movement to cutter movement is established by dimensioning consistent with the following formula, derived for this invention:

$$S = 2G - C/H + C + 2A$$

Where:
S = Seal Movement For Unit Cone Movement Relative to Shaft
H = Effective Shaft O-Ring 165 Annular Area
C = Effective Cutter O-Ring 167 Annular Area
G = Effective Cutter Seal Groove Annular Area The ratio of seal movement to cutter movement of about one half to one is achieved using the above formula, a circumferential wall 159 diameter of 2.970 inch, and the following annular areas:
H = 0.945 sq. inch
C = 1.041 sq. inch
A = 0.587 sq. inch
G = 1.311 sq. inch The formula assumes no radial bearing clearance, no lubricant flow to or from the seal assembly, no or offsetting changes in annular areas H, C, A and G, and rolling, nonsliding movement of the energizer rings 165, 167.

The preferred assembly method uses the steps of forming about one half the groove in the cutter 147 and the other half in the shaft 135, assembling one rigid ring 169 and energizer ring 165 in the seal region of the shaft 135, assembling the sleeve 149 and then the other rigid ring 171 and the mating energizer ring 167 in the cutter 147, and then assembling the cutter 147 and sleeve 149 on the shaft 135 against shoulder 177, the sleeve 149 engaging the shaft 135 with an interference fit.

During drilling with the embodiment shown in FIGS. 8 and 9, cutter 147 will move on the shaft 135 in a complex, wobbling fashion. The above formula assumes simpler, axial movements of the cutter but is thought to be sufficiently accurate to be useful in establishing design parameters for groove and seal assembly geometries.

The advantages of the embodiment of FIGS. 8 and 9 over the embodiment of FIGS. 1 through 7 are: (1) Pressure changes in the lubricant adjacent the seal assembly during drilling and consequent cutter movement are greatly reduced, ideally eliminated; (2) variations in loading on the faces of the rigid rings 169, 171 are minimized; (3) rolling motions of the energizer rings 165,167 are more equalized; (4) since any axial movement of the seal assembly is less than axial movement of the cutter, the clearances with end walls 157, 161 may be minimized.

FIGS. 10-11

Figure 10:
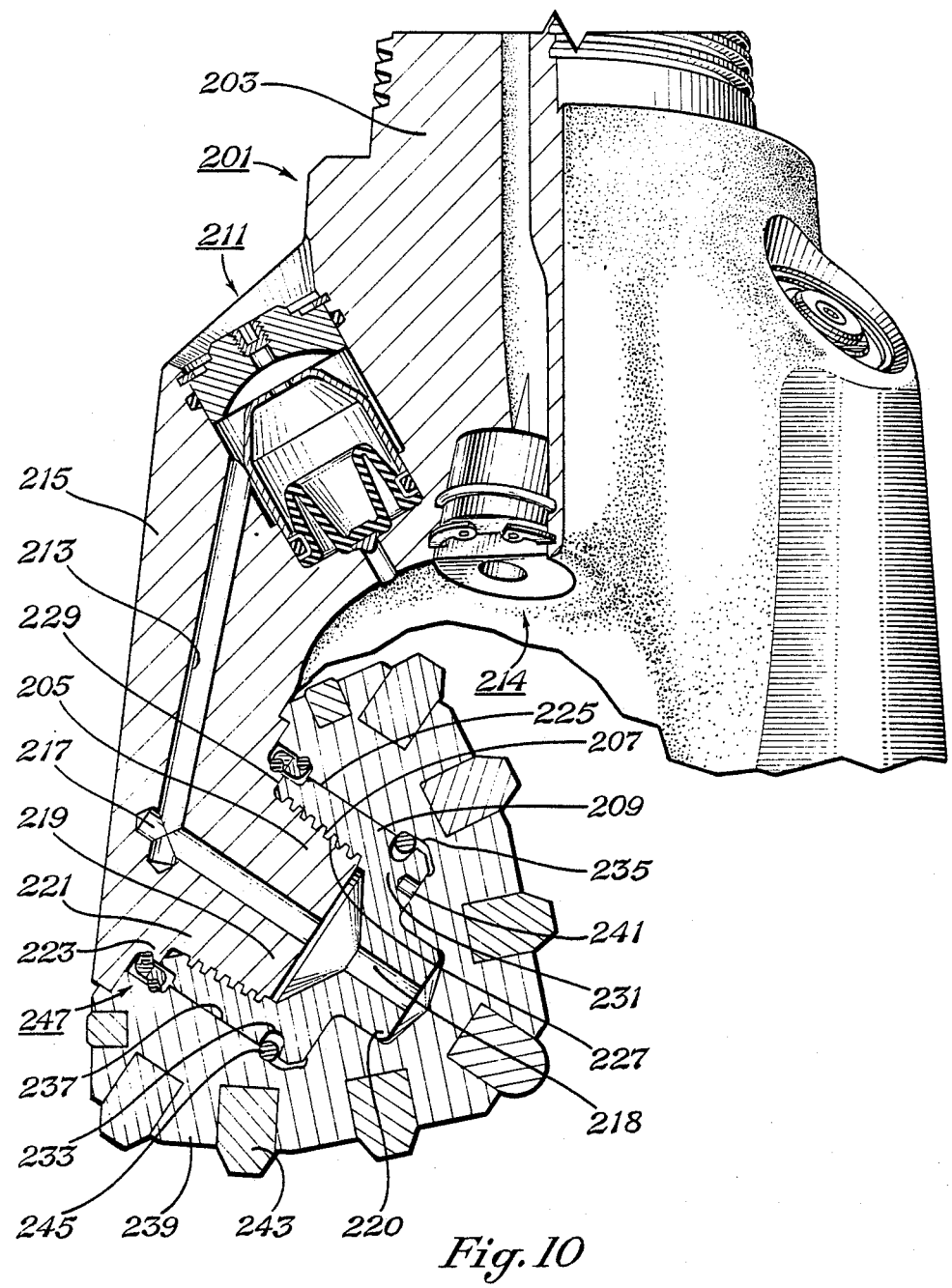
FIG. 10 is a fragmentary view of another embodiment of an earth boring bit, partially in longitudinal section, that utilizes a threaded bearing sleeve to form the journal bearing of the shaft and a portion of a seal groove.
Figure 11:
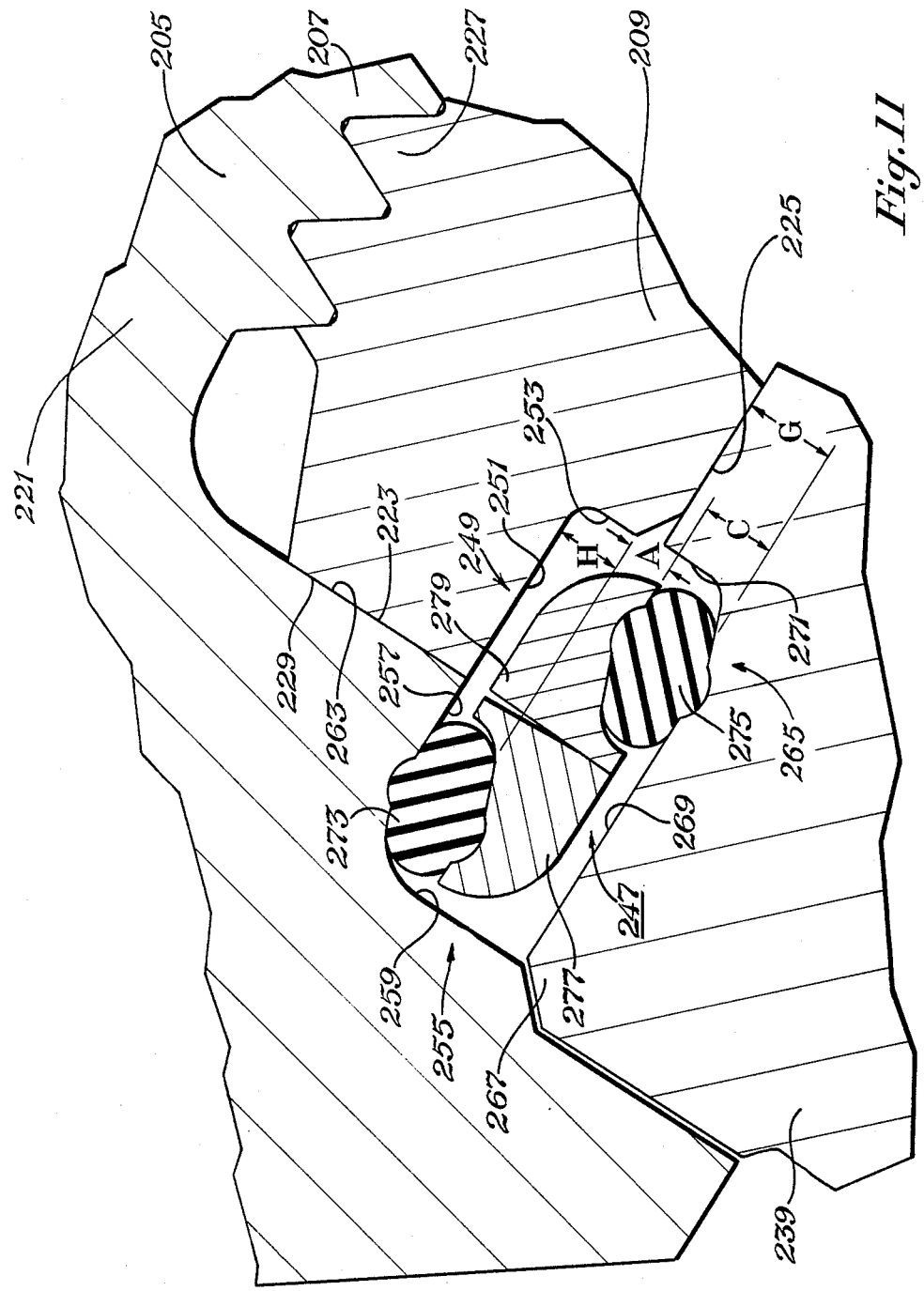
FIG. 11 is an enlarged fragmentary view in longitudinal section of the bearing, cutter and seal assembly of FIG. 10.

The improvement of this continuation-in-part is disclosed in FIGS. 10-11. Here, an earth boring bit 201 has three head sections 203 that are welded to form a body. Extending inwardly and downwardly from each of the sections 203 is a cantilevered bearing lug 205, threaded at 207 to receive an internally threaded bearing sleeve 209. This type of bearing arrangement is shown in U.S. Pat. No. 4,600,064, "Earth Boring Bit With Bearing Sleeve", July 15, 1986.

In an upper portion of each head section 203 is a compensator 211 that forms part of a compensator system that includes passages 213, a preferred form of compensator being shown in U.S. Pat. No. 4,276,946, "Biased Lubricant Compensator For An Earth Boring Drill Bit", July 7, 1981. Conventional nozzle means 214 direct drilling fluid toward a borehole bottom. A part of the passage 213 extends through the leg 215 of the section 203 into intersection with another passage 217, formed in this instance coaxially with the bearing lug 205. Lubricant is introduced from passage 217 through a passage 218 in a pilot pin 220 formed on sleeve 209.

The thread 207 formed on the exterior of the bearing lug 205 diverges outwardly from an inner end region 219 to an outer base region 221, having a shoulder 223 which is transverse or perpendicular with respect to the rotational axis of the lug 205. The thread form is an A.P.I V-0.040 with a 2.708 inch pitch diameter at 0.625 inch from shoulder 223.

The bearing sleeve 209 attached to the bearing lub 205 has a substantially cylindrical exterior journal bearing surface 225, a tapered and threaded interior portion 227 that mates with the threads 207 of the lug 205, and a traverse mouth 229 that mates with the shoulder 223 of the base region 221 of the lug. The radial thickness of the mouth 229 is substantially 0.345 inch, for a 14¾ inch bit provided by way of example, the sleeve beign made from a metal alloy with a minimum yield strength so as to provide a torsional yield strength of substantially 11,000 foot pounds.

From the drawing it is apparent that the bearing sleeve 209 and its cylindrical journal bearing portion 225 has a length greater than that of its threaded portion 227 to define a thick walled inner end portion 231 in which is formed an assembly groove 233 that opposes or registers with a retainer groove 235 formed in the cylindrical bearing portion 237 of the cutter 239. The minimum thickness of the metal between the assembly groove 233 and the threaded portion 227 of the bearing sleeve 209 for the 14¾ diameter bit provided by way of example should be substantially 0.422 inch. A drive pin hole 241 provides a means to apply a selected torque of about 2500 foot pounds to the sleeve on assembly with the lug 205. The cutter is of a conventional configuration, with earth disintegrating teeth 243, and is retained on the bearign sleeve 209 with a resilient snap ring 245 having a curved cross section and groove configuration with curved bottom portion of the type disclosed in U.S. Pat. No. 4,236,764, "Earth Boring Drill Bit With Snap Ring Cutter Retention", Dec. 2, 1980.

The sleeve 209 has a boronizing treatment of the type describe in U.S. Pat. No. 3,922,038, "Wear Resistant Boronized Surfaces And Boronizing Methods", Nov. 25, 1975, on the exterior eylindrical surface 225 to improve wear resistance. This treatment provides the requisitie improvement to wear resistance without causing a substantial weakening of the sleeve.

A bearing seal assembly 247 is essentially that as shown in connection with the above description of FIGS. 1-7 but the seal groove arrangement is similar to that of FIGS. 8-9. Referring to FIG. 11, the seal assembly 247 is disposed partially within a generally L shaped, shaft seal groove 249, a portion of which is in the outer end of the sleeve 209. The shaft seal groove 249 includes a circumferential, generally cylindrical outer wall 251 and a radial inner end wall 253. A second portion 255 of the shaft seal groove 249 includes a circumferential wall 257 and a radial outer end wall 259 formed on the shoulder 223 on the base region of the bearing lug 205. The mouth 229 of the sleeve 209 is transverse and sealingly engages an opposed surface 263 of the shoulder 223 of the bearing lug 205.

An opposed, generally L-shaped cutter seal groove 265 is formed in the outer, mouth region 267 of the cutter 239, and includes a circumferential, generally cylindrical wall 269 and a radial end wall 271.

Confined within the above described cutter seal groove 265 and shaft seal groove 249 are a pair of energizer rings 273, 275 and a pair of rigid annular rings 277, 279. The geometries of the groove surfaces, the energizer rings and the annular rings shown here are identical with those described in connection with FIGS. 8-9. The journal bearing surface 225 of the bearing sleeve is located substantially midway betwen the circumferential walls 251, 269 in the preferred embodiment.

The improvement of FIGS. 10-11 decreases the lubricant pressure and volume changes in the vicinity of the seal assembly by positioning the seal groove and seal assembly in relation to the journal bearing surface such that the ratio of rigid ring seal movement to cutter movement is about one half. Seal movement for unit cone movement is established by using dimensions A, C, G and H consistent with the formula provided in describing FIGS. 8-9.

The advantages of the embodiment of FIGS. 10-11 are similar to those of FIGS. 1-7 and 8-9, but in addition, the assembly problems associated with FIGS. 8-9 are avoided.

While the invention has been shown in only the preferred forms, it should be apparent to those skilled in the art aht it is not thus limited, but is susceptible to various changes and modifications without departing from the spirit thereof.

I claim:

1. An earth boring bit with an improved pressure compensating, rigid face seal assembly having one rigid ring and sealing face carried by a bearing shaft and an opposed sealing face carried by the cutter, said bit comprising:

a body;

a threaded and cantilevered bearing lug positioned to extend obliquely inwardly and downwardly from the body;

an internally threaded bearing sleeve screwed onto the bearing lug to form a journal bearing on the bearing shaft;

a cutter having a generally cylindrical bearing formed internally therein, secured for rotation about the journal bearing of the shaft;

a lubrication system in the body, including a hydrostatic pressure compensator, to lubricate said bearings;

a cutter seal groove formed near the outermost region of the cylindrical bearing in the cutter to have a circumferential, generally cylindrical wall;

a shaft seal groove formed at least partially in the bearing sleeve to oppose the cutter seal groove and having a circumferential, generally cylindrical wall;

at least one rigid ring positioned between the shaft and cutter seal grooves with one sealing face engaging the opposed sealing face carried by a selected one of the shaft and the cutter;

at least one resilient energizer ring sealingly engaging a selected circumferential wall of the cutter and shaft seal groove and sealingly engaging the rigid ring;

the diameter of the journal bearing being intermediate the circumferential walls of the cutter and shaft seal grooves to decrease axial movement of the rigid ring with respect to axial cutter movement to a selected ration during drilling.

2. The invention defined by claim 1 wherein the ratio of the seal movement to axial cutter movement is selected to decrease seal movement, consistent with the following formula:

$$S = 2G - C/H + C + 2A$$

Where:
S = Seal Movement For Unit Cutter movement Relative to the Shaft
H = Effective Shaft O-Ring Annular Area
C = Effective Cutter O-Ring Annular Area
A = Effective Rigid Ring Annular Area
G = Effective Cutter Seal Groove Annular Area.

3. The invention defined by claim 1 wherein the ratio of rigid ring movement to axial cutter movement is substantially one half to one.

4. An earth boring bit with an improved pressure compensating, rigid face seal assembly having one rigid ring and sealing face carried by a bearing shaft and an opposed sealing face carried by the cutter, said bit comprising:

a body;

a threaded and cantilevered bearing lug positioned to extend obliquely inwardly and downwardly from the body;

an internally threaded bearing sleeve screwed onto the bearing lug to form a generally cylindrical journal bearing on the bearing shaft;

a cutter having a generally cylindrical bearing formed internally therein, secured for rotation about the journal bearing of the shaft;

a lubrication system in the body, including a hydrostatic pressure compensator, to lubricate said bearings;

a cutter seal groove formed near the outermost region of the cylindrical bearing in the cutter to have a circumferential, generally cylindrical wall;

a shaft seal groove formed at least partially in the bearing sleeve to oppose the cutter seal groove and having a circumferential, generally cylindrical wall;

a pair of rigid rings positioned in the seal grooves to have opposed sealing faces;

a pair of resilient energizer rings, each of which sealingly engages a respective one of the rigid rings and one of the oppositely facing circumferential walls of the cutter and shaft seal grooves to define a real assembly;

the diameter of the journal bearing being intermediate the diameters of the circumferential walls of the cutter and shaft seal grooves to decrease axial movement of the rigid rings with respect to axial cutter movement to a selected ration when the cutter moves axially on the bearing shaft during drilling.

5. The invention defined by claim 4 wherein the ratio of the seal movement to axial cutter movement is selected to decrease seal movement, consistent with the following formula:

$$S = 2G - C/H + C + 2A$$

Where:
S = Seal Movement For Unit Cutter Movement Relative to the Shaft
C = Effective Cutter O-Ring Annular Area
A = Effective Rigid Ring Annular Area
G = Effective Cutter Seal Groove Annular Area.

6. The invention defined by claim 4 wherein the ratio of rigid ring movement to axial cutter movement is substantially one half to one.

7. An earth boring bit with an improved pressure compensating, rigid face seal assembly having one rigid sealing face carried by a bearing shaft and an opposed sealing face carried by the cutter, said bit comprising:

a body which includes at least one leg and a cantilevered and threaded bearing lug that extends downwardly and inwardly;

a lubrication system formed at least partially in the body, including a hydrostatic pressure compensator, to lubricate said bearings;

the bearing lug including a threaded inner end and an outer base region with a transverse shoulder secured to the body;

a bearing sleeve with a substantially cylindrical journal bearing surface containing an assembly groove for a cutter retainer means, a threaded interior secured to the the threaded end of the bearing lug, and a mouth engaging the transverse shoulder of the lug;

a rotatable cutter having an interior cylindrical bearing surface, a retainer groove that registers with the assembly groove in the bearing sleeve, and an annular, cutter seal groove in the outer end of the bearing surface;

retainer means between the assembly groove and the retainer groove;

a cutter seal groove formed near the outermost region of the cylindrical bearing in the cutter to have a circumferential, generally cylindrical wall and a generally radial end wall;

a shaft real groove formed at least partially in the outer end of the bearing sleeve and the transverse shoulder of the bearing lug to oppose the cutter seal groove, and having a circumferential, generally cylindrical wall and a generally radial end wall;

at least one rigid ring positioned between the shaft and cutter seal grooves with one sealing face engaging the opposed sealing face carried by a selected one of the shaft and the cutter, at least one resilient energizer ring sealingly engaging a selected circumferential wall of the cutter and shaft seal groove and sealingly engaging the rigid ring;

the axial width of the rigid ring being less than the axial width of the shaft and cutter grooves when the cutter is thrust outward on the bearing shaft to define at least one axial clearance to permit unrestricted axial movement of the seal assembly between the radial end walls;

the diameter of the journal bearing being intermediate the circumferential walls of the cutter and shaft seal grooves to decrease axial movement of the rigid ring with respect to axial cutter movement to a selected ratio during drilling.

8. The invention defined by claim 7 wherein the ratio of the seal movement to axial cutter movement is selected to decrease seal movement, consistent with the following formula:

$$S = 2G - C/H + C + 2A$$

Where:
S = Seal Movement For Cutter Movement Relative to the Shaft
H = Effective Shaft O-Ring Annular Area
C = Effective Cutter O-Ring Annular Area
A = Effective Rigid Ring Annular Area
G = Effective Cutter Seal Groove Annular Area.

9. The invention defined by claim 8 wherein each of the resilient energizer rings is of the O-ring type and the ratio of rigid ring movement to axial cutter movement is substantially one half to one.

10. An earth boring bit with an improved pressure compensating, rigid face seal assembly having one rigid ring and sealing face carried by a bearing shaft and an opposed sealing face carried by the cutter, said bit comprising:
a body which includes at least one leg and a cantilevered and threaded bearing lug that extends downwardly and inwardly;
a lubrication system formed at least partially in the body, including a hydrostatic pressure compensator, to lubricate said bearings;
the bearing lug including a threaded inner end and an outer base region with a transverse shoulder secured to the body;
a bearing sleeve with a substantially cylindrical journal bearing surface containing an assembly groove for a cutter retainer means, a threaded interior secured to the the threaded end of the bearing lug, and a mouth engaging the transverse shoulder of the lug;
a rotatable cutter having an interior cylindrical bearing surface, a retainer groove that registers with the assembly groove in the bearing sleeve, and an annular, cutter seal groove in the outer end of the bearing surface;
retainer means between the assembly groove and the retainer groove;
a cutter seal groove formed near the outermost region of the cylindrical bearing in the cutter to have a circumferential, generally cylindrical wall and a generally radial end wall;
a shaft seal groove formed at least partially in the outer end of the bearing sleeve and the transverse shoulder of the bearing lug to oppose the cutter seal groove, and having a circumferential, generally cylindrical wall and a generally radial end wall;
a pair of rigid rings positioned in the seal grooves to have opposed, sealing faces;
a pair of resilient energizer rings, each of which sealingly engages a respective one of the rigid rings and one of the oppositely facing circumferential walls of the cutter and shaft seal grooves to define a seal assembly;
the axial width of the rigid rings being less than the axial width of the shaft and cutter seal grooves when the cutter is thrust outward on the bearing shaft to define at least one axial clearance to permit unrestricted axial movement of the seal assembly between the radial end walls;
the diameter of the journal bearing being intermediate the circumferential walls of the cutter and shaft seal grooves to decrease axial movement of the seal assembly to a selected ratio when the cutter moves axially on the bearing shaft during drilling.

11. The invention defined in claim 10 wherein the ratio of the seal movement to axial cutter movement is selected to decrease seal movement, consistent with the following formula:

$$S = 2G - C/H + C + 2A$$

Where:
S = Seal Movement For Unit Cutter Movement relative to the Shaft
H = Effective Shaft O-Ring Annular Area
C = Effective Cutter O-Ring Annular Area
A = Effective Rigid Ring Annular Area
G = Effective Cutter Seal Groove Annular Area.

12. The invention defined by claim 11 wherein each of the resilient energizer rings is of the O-ring type and the ratio of rigid ring movement to axial cutter movement is substantially one half to one.

13. An earth boring bit with an improved seal means and pressure compensating system, said bit comprising:
a body which includes at least one leg and a cantilevered and threaded bearing lug that extends downwardly and inwardly;
a lubrication system formed at least partially in the body, including a hydrostatic pressure compensator, to lubricate said bearings;
the bearing lug including a threaded inner end and an outer base region with a transverse shoulder secured to the body;
a bearing sleeve with a substantially cylindrical journal bearing surface containing an assembly groove for a cutter retainer means, a threaded interior secured to the threaded end of the bearing lug, and a mouth engaging the transverse shoulder of the lug;
a rotatable cutter having an interior cylindrical bearing surface, a retainer groove that registers with the assembly groove in the bearing sleeve, and an annular, cutter seal groove in the outer end of the bearing surface;

retainer means between the assembly groove and the retainer groove;

a cutter seal groove formed near the outermost region of the cylindrical bearing in the cutter to have a circumferential, generally cylindrical wall and a generally radial end wall;

a shaft seal groove formed at least partially in the end of the bearing sleeve and the transverse shoulder of the bearing lug to oppose the cutter seal groove, and having a circumferential, generally cylindrical wall and a generally radial end wall;

a pair of rigid rings positioned in the seal grooves to have opposed and engaging sealing faces;

a pair of resilient energizer rings, each of which sealingly engages a respective one of the rigid rings and one of the oppositely facing circumferential walls of the cutter and shaft seal grooves to define a seal assembly positioned between the end walls of the cutter and shaft seal grooves;

the seal assembly being exposed to and moved axially by dynamic pressure differentials between the lubricant and the ambient drilling fluids;

the axial width of the engaged rigid rings and seal assembly being less than the axial, minimum width of the cutter and shaft seal grooves when the cutter is thrust outwardly on the bearing shaft to define at least one axial clearance to permit axial movement of the rigid rings between the end walls of the groove when the cutter moves relative to the bearing shaft;

the diameter of the journal bearing being intermediate the circumferential walls of the seal groove to decrease axial movement of the seal assembly to a selected ratio when the cutter moves axially on the bearing shaft.

14. The invention defined by claim 13 wherein the ratio of the seal movement to axial cutter movement is selected to decrease seal movement, consistent with the following formula:

$$S = 2G - C/H + C + 2A$$

Where:
- $S$ = Seal Movement For Unit Cutter Movement Relative to the Shaft
- $H$ = Effective Shaft O-Ring Annular Area
- $C$ = Effective Cutter O-Ring Annular Area
- $A$ = Effective Rigid Cutter Annular Area
- $G$ = Effective Cutter Seal Groove Annular Area.

15. The invention defined by claim 13 wherein each of the resilient energizer rings is of the O-ring type and the ratio of rigid ring movement to axial cutter movement is substantially one half to one.

* * * * *